US009549056B2

(12) United States Patent
Hawkins et al.

(10) Patent No.: US 9,549,056 B2
(45) Date of Patent: Jan. 17, 2017

(54) INTEGRATED PERSONAL DIGITAL ASSISTANT DEVICE

(71) Applicant: QUALCOMM Incorporated, San Diego, CA (US)

(72) Inventors: Jeffrey Charles Hawkins, Redwood City, CA (US); Thomas Bridgwater, San Francisco, CA (US); Robert Yuji Haitani, Menlo Park, CA (US); William Rees, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 14/947,852

(22) Filed: Nov. 20, 2015

(65) Prior Publication Data

US 2016/0080582 A1  Mar. 17, 2016

Related U.S. Application Data

(63) Continuation of application No. 13/117,729, filed on May 27, 2011, now Pat. No. 9,203,940, which is a
(Continued)

(51) Int. Cl.
*H04M 19/04* (2006.01)
*H04M 1/725* (2006.01)
(Continued)

(52) U.S. Cl.
CPC ....... *H04M 1/72519* (2013.01); *H04M 1/0245* (2013.01); *H04M 1/72522* (2013.01);
(Continued)

(58) Field of Classification Search
CPC .. H04M 1/0245; H04M 1/66; H04M 1/72522; H04M 1/7258; H04W 48/04
(Continued)

(56) References Cited

U.S. PATENT DOCUMENTS 3,573,376 A   4/1971  Bartlett et al.
4,279,021 A   7/1981  See et al.
(Continued)

FOREIGN PATENT DOCUMENTS

CA   2187050 A1   5/1997
EP   0149762 A1   7/1985
(Continued)

OTHER PUBLICATIONS

American Programmer, N.Y., American Programmer, Inc. (Dec. 1991), pp. 4-33.
(Continued)

*Primary Examiner* — Sam Bhattacharya
(74) *Attorney, Agent, or Firm* — Paradice and Li LLP

(57) ABSTRACT

An integrated device provides functionality of both a PDA and cellular telephone. Features include a power button offering control of both the computing and telephony functions of the device; a lid that turns the device on and off and controls additional telephony functions; a jog rocker that activates the device and is used to select from a variety of menu options; application buttons that offer direct access to applications stored on the device, and which can be configured to operate in conjunction with secondary keys to offer added functionality; a keyboard that enables data input into the device; an automatic word completion function that verifies and corrects a user's typing in real time; and a simplified keyboard navigation system that allows the navigation of menus using keyboard shortcuts.

45 Claims, 10 Drawing Sheets

Related U.S. Application Data continuation of application No. 12/163,948, filed on Jun. 27, 2008, now Pat. No. 8,224,379, which is a continuation of application No. 09/976,475, filed on Oct. 12, 2001, now Pat. No. 7,395,089.

(60) Provisional application No. 60/297,817, filed on Jun. 11, 2001.

(51) Int. Cl.
  *H04M 1/02* (2006.01)
  *H04W 88/06* (2009.01)
  *H04W 52/02* (2009.01)

(52) U.S. Cl.
  CPC ......... *H04M 19/04* (2013.01); *H04M 19/047* (2013.01); *H04M 19/048* (2013.01); *H04W 52/027* (2013.01); *H04W 88/06* (2013.01)

(58) Field of Classification Search
  USPC ............. 455/556.1, 556.2, 575.3, 557, 412.1
  See application file for complete search history.

(56) References Cited

U.S. PATENT DOCUMENTS

| | | |
|---|---|---|
| 4,415,065 A | 11/1983 | Sandstedt |
| 4,545,023 A | 10/1985 | Mizzi |
| 4,587,630 A | 5/1986 | Straton et al. |
| 4,725,694 A | 2/1988 | Auer et al. |
| 4,797,912 A | 1/1989 | Hashimoto |
| 4,799,254 A | 1/1989 | Dayton et al. |
| 4,916,441 A | 4/1990 | Gombrich |
| 4,922,526 A | 5/1990 | Morganstein et al. |
| 4,931,783 A | 6/1990 | Atkinson |
| 4,972,457 A | 11/1990 | O'Sullivan |
| 4,996,704 A | 2/1991 | Brunson |
| 5,010,547 A | 4/1991 | Johnson et al. |
| 5,067,164 A | 11/1991 | Denker et al. |
| 5,075,684 A | 12/1991 | Deluca |
| 5,101,439 A | 3/1992 | Kiang |
| 5,127,041 A | 6/1992 | O'Sullivan |
| RE34,034 E | 8/1992 | O'Sullivan |
| 5,148,471 A | 9/1992 | Metroka et al. |
| 5,175,759 A | 12/1992 | Metroka et al. |
| 5,189,632 A | 2/1993 | Paajanen et al. |
| 5,227,614 A | 7/1993 | Danielson et al. |
| 5,249,218 A | 9/1993 | Sainton |
| 5,334,824 A | 8/1994 | Martinez |
| 5,335,276 A | 8/1994 | Thompson et al. |
| 5,353,334 A | 10/1994 | O'Sullivan |
| 5,367,563 A | 11/1994 | Sainton |
| D354,478 S | 1/1995 | Miyahara |
| 5,379,057 A | 1/1995 | Clough et al. |
| 5,384,844 A | 1/1995 | Rydbeck |
| 5,392,447 A | 2/1995 | Schlack et al. |
| 5,394,140 A | 2/1995 | Wong et al. |
| 5,396,544 A | 3/1995 | Gilbert et al. |
| 5,410,593 A | 4/1995 | Kamota |
| D359,734 S | 6/1995 | Nagele et al. |
| 5,430,436 A | 7/1995 | Fennell |
| 5,436,960 A | 7/1995 | Campana, Jr. et al. |
| 5,438,611 A | 8/1995 | Campana, Jr. et al. |
| 5,446,759 A | 8/1995 | Campana, Jr. |
| 5,465,401 A | 11/1995 | Thompson |
| 5,479,472 A | 12/1995 | Campana, Jr. et al. |
| 5,485,373 A | 1/1996 | Davis et al. |
| 5,496,992 A | 3/1996 | Madan et al. |
| 5,500,643 A | 3/1996 | Grant |
| 5,550,715 A | 8/1996 | Hawkins |
| 5,584,054 A | 12/1996 | Tyneski et al. |
| 5,585,749 A | 12/1996 | Pace et al. |
| 5,594,640 A | 1/1997 | Capps et al. |
| 5,612,682 A | 3/1997 | Deluca et al. |
| 5,625,670 A | 4/1997 | Campana, Jr. et al. |
| 5,631,946 A | 5/1997 | Campana, Jr. et al. |
| 5,633,912 A | 5/1997 | Tsoi |
| 5,640,146 A | 6/1997 | Campana, Jr. |
| 5,640,444 A | 6/1997 | O'Sullivan |
| 5,650,769 A | 7/1997 | Campana, Jr. |
| 5,650,776 A | 7/1997 | Mitchell et al. |
| 5,673,040 A | 9/1997 | Hargreaves et al. |
| D385,875 S | 11/1997 | Harris et al. |
| D386,497 S | 11/1997 | Henderson et al. |
| 5,694,428 A | 12/1997 | Campana, Jr. |
| 5,710,798 A | 1/1998 | Campana, Jr. |
| 5,714,937 A | 2/1998 | Campana, Jr. |
| 5,717,725 A | 2/1998 | Campana, Jr. |
| 5,722,059 A | 2/1998 | Campana, Jr. |
| 5,722,064 A | 2/1998 | Campana, Jr. |
| 5,724,408 A | 3/1998 | Morganstein |
| D393,856 S | 4/1998 | Lee et al. |
| 5,742,644 A | 4/1998 | Campana, Jr. |
| 5,745,532 A | 4/1998 | Campana, Jr. |
| 5,748,100 A | 5/1998 | Gutman et al. |
| 5,751,707 A | 5/1998 | Voit et al. |
| 5,751,773 A | 5/1998 | Campana, Jr. |
| D395,300 S | 6/1998 | Yamazaki et al. |
| 5,761,621 A | 6/1998 | Sainton |
| 5,790,659 A | 8/1998 | Strand |
| 5,793,365 A | 8/1998 | Tang et al. |
| 5,797,089 A | 8/1998 | Nguyen |
| 5,797,098 A | 8/1998 | Schroeder et al. |
| 5,798,759 A | 8/1998 | Dahl |
| 5,805,633 A | 9/1998 | Uddenfeldt |
| 5,805,978 A | 9/1998 | Souissi et al. |
| 5,812,117 A | 9/1998 | Moon |
| 5,818,437 A | 10/1998 | Grover et al. |
| 5,819,172 A | 10/1998 | Campana, Jr. et al. |
| 5,825,353 A | 10/1998 | Will |
| 5,825,675 A | 10/1998 | Want et al. |
| 5,844,967 A | 12/1998 | Lee |
| 5,854,985 A | 12/1998 | Sainton et al. |
| 5,864,805 A | 1/1999 | Chen et al. |
| 5,870,492 A | 2/1999 | Shimizu et al. |
| 5,884,193 A | 3/1999 | Kaplan |
| 5,884,323 A | 3/1999 | Hawkins et al. |
| D408,021 S | 4/1999 | Grove et al. |
| D408,030 S | 4/1999 | Kottke et al. |
| 5,894,505 A | 4/1999 | Koyama |
| D409,185 S | 5/1999 | Kawashima |
| D410,486 S | 6/1999 | Takahata et al. |
| 5,918,188 A | 6/1999 | Doran |
| 5,926,170 A | 7/1999 | Oba |
| 5,938,772 A | 8/1999 | Welch |
| 5,943,401 A | 8/1999 | Risner et al. |
| 5,949,408 A | 9/1999 | Kang et al. |
| 5,952,942 A | 9/1999 | Balakrishnan et al. |
| 5,957,595 A | 9/1999 | Chen |
| 5,958,006 A | 9/1999 | Eggleston et al. |
| 5,966,671 A | 10/1999 | Mitchell et al. |
| 5,974,238 A | 10/1999 | Chase, Jr. |
| D416,001 S | 11/1999 | Boyle et al. |
| D416,256 S | 11/1999 | Griffin et al. |
| 5,983,073 A | 11/1999 | Ditzik |
| 5,990,872 A | 11/1999 | Jorgenson et al. |
| 5,991,290 A | 11/1999 | Malik |
| 5,995,852 A * | 11/1999 | Yasuda ................. H04M 19/04 379/373.02 |
| 5,996,956 A | 12/1999 | Shawver |
| 6,000,000 A | 12/1999 | Hawkins et al. |
| 6,005,496 A | 12/1999 | Hargreaves et al. |
| 6,006,274 A | 12/1999 | Hawkins et al. |
| 6,011,554 A | 1/2000 | King et al. |
| 6,022,156 A | 2/2000 | Blish |
| 6,028,923 A | 2/2000 | Kolb et al. |
| D421,744 S | 3/2000 | Junichi |
| 6,040,829 A | 3/2000 | Croy et al. |
| 6,043,760 A | 3/2000 | Laakkonen |
| D423,468 S | 4/2000 | Jenkins |
| 6,047,196 A | 4/2000 | Makela et al. |
| 6,049,796 A | 4/2000 | Siitonen et al. |
| 6,052,735 A | 4/2000 | Ulrich et al. |
| 6,055,305 A | 4/2000 | Norman et al. |

(56) References Cited

U.S. PATENT DOCUMENTS

| | | |
|---|---|---|
| 6,058,304 A | 5/2000 | Callaghan et al. |
| 6,067,451 A | 5/2000 | Campana, Jr. et al. |
| 6,075,925 A | 6/2000 | Downing et al. |
| 6,081,845 A | 6/2000 | Kanemaki et al. |
| D432,099 S | 10/2000 | Loh et al. |
| D432,535 S | 10/2000 | Loh et al. |
| D433,016 S | 10/2000 | Matsuda et al. |
| 6,134,453 A | 10/2000 | Sainton et al. |
| 6,141,540 A | 10/2000 | Richards et al. |
| 6,154,758 A | 11/2000 | Chiang |
| 6,157,630 A | 12/2000 | Adler et al. |
| 6,160,926 A | 12/2000 | Dow et al. |
| 6,169,485 B1 | 1/2001 | Campana, Jr. |
| 6,188,789 B1 | 2/2001 | Haitani et al. |
| D439,232 S | 3/2001 | Ledingham et al. |
| 6,198,783 B1 | 3/2001 | Campana, Jr. |
| 6,204,848 B1 | 3/2001 | Nowlan et al. |
| RE37,141 E | 4/2001 | O'Sullivan |
| D440,959 S | 4/2001 | Wolf et al. |
| 6,219,413 B1 | 4/2001 | Burg |
| 6,219,694 B1 | 4/2001 | Lazaridis et al. |
| D442,156 S | 5/2001 | Lee |
| 6,229,878 B1 | 5/2001 | Moganti |
| D443,865 S | 6/2001 | Kim |
| D446,199 S | 8/2001 | Xu et al. |
| 6,272,190 B1 | 8/2001 | Campana, Jr. |
| 6,278,442 B1 | 8/2001 | Griffin et al. |
| 6,288,718 B1 | 9/2001 | Laursen et al. |
| 6,295,052 B1 | 9/2001 | Kato et al. |
| 6,295,372 B1 | 9/2001 | Hawkins et al. |
| 6,295,460 B1 | 9/2001 | Nagel et al. |
| 6,297,795 B1 | 10/2001 | Kato et al. |
| 6,307,548 B1 | 10/2001 | Flinchem et al. |
| 6,310,926 B1 | 10/2001 | Tore |
| D450,307 S | 11/2001 | Xu et al. |
| 6,317,592 B1 | 11/2001 | Campana, Jr. et al. |
| 6,330,618 B1 | 12/2001 | Hawkins et al. |
| D454,349 S | 3/2002 | Makidera et al. |
| D455,135 S | 4/2002 | Hyun |
| 6,370,518 B1 | 4/2002 | Payne et al. |
| 6,377,685 B1 | 4/2002 | Krishnan |
| D456,805 S | 5/2002 | Ono et al. |
| 6,396,482 B1 | 5/2002 | Griffin et al. |
| 6,397,078 B1 | 5/2002 | Kim |
| 6,421,707 B1 | 7/2002 | Miller et al. |
| 6,452,588 B2 | 9/2002 | Griffin et al. |
| 6,463,464 B1 | 10/2002 | Lazaridis et al. |
| 6,477,482 B1 | 11/2002 | Maupin et al. |
| 6,487,602 B1 | 11/2002 | Thakker |
| D466,877 S | 12/2002 | Hawkins et al. |
| D467,235 S | 12/2002 | Hawkins et al. |
| 6,489,950 B1 | 12/2002 | Griffin et al. |
| 6,549,304 B1 | 4/2003 | Dow et al. |
| RE38,127 E | 5/2003 | O'Sullivan |
| 6,587,132 B1 | 7/2003 | Smethers |
| 6,606,082 B1 | 8/2003 | Zuberec et al. |
| 6,611,254 B1 | 8/2003 | Griffin et al. |
| 6,611,255 B2 | 8/2003 | Griffin et al. |
| 6,611,697 B1 | 8/2003 | Ewing et al. |
| 6,662,244 B1 | 12/2003 | Takahashi |
| 6,665,173 B2 | 12/2003 | Brandenberg et al. |
| 6,671,702 B2 | 12/2003 | Kruglikov et al. |
| 6,677,932 B1 | 1/2004 | Westerman |
| 6,701,378 B1 | 3/2004 | Gilhuly et al. |
| 6,705,520 B1 | 3/2004 | Pitroda et al. |
| 6,725,060 B1 | 4/2004 | Chhatriwala et al. |
| 6,727,830 B2 | 4/2004 | Lui et al. |
| 6,727,916 B1 | 4/2004 | Ballard |
| 6,728,786 B2 | 4/2004 | Hawkins et al. |
| 6,741,235 B1 | 5/2004 | Goren |
| 6,774,927 B1 | 8/2004 | Cohen et al. |
| 6,836,759 B1 | 12/2004 | Williamson et al. |
| 6,856,809 B2 | 2/2005 | Fostick |
| 6,857,105 B1 | 2/2005 | Fox et al. |
| 6,867,763 B2 | 3/2005 | Griffin et al. |
| 6,873,317 B1 | 3/2005 | Griffin et al. |
| 6,874,011 B1 | 3/2005 | Spielman et al. |
| 6,874,037 B1 | 3/2005 | Abram et al. |
| 6,891,529 B2 | 5/2005 | Ladouceur et al. |
| 6,919,879 B2 | 7/2005 | Griffin et al. |
| 6,934,558 B1 | 8/2005 | Sainton et al. |
| 6,950,988 B1 | 9/2005 | Hawkins et al. |
| 6,957,397 B1 | 10/2005 | Hawkins et al. |
| 6,961,584 B2 | 11/2005 | Leedom et al. |
| 6,975,304 B1 | 12/2005 | Hawkins et al. |
| 7,048,456 B2 | 5/2006 | Keinonen et al. |
| 7,054,441 B2 | 5/2006 | Pletikosa |
| 7,061,403 B2 | 6/2006 | Fux |
| 7,069,056 B2 | 6/2006 | Iwata et al. |
| RE39,231 E | 8/2006 | Yasuda et al. |
| 7,136,897 B1 | 11/2006 | Raghunandan |
| RE39,427 E | 12/2006 | O'Sullivan |
| 7,155,521 B2 | 12/2006 | Lahti et al. |
| 7,171,108 B1 | 1/2007 | Masters et al. |
| 7,218,242 B2 | 5/2007 | Scalisi et al. |
| 7,231,229 B1 | 6/2007 | Hawkins et al. |
| 7,260,390 B1 | 8/2007 | Skinner et al. |
| 7,313,389 B1 | 12/2007 | Sharp et al. |
| 7,356,361 B1 | 4/2008 | Hawkins et al. |
| 7,395,089 B1 | 7/2008 | Hawkins et al. |
| 7,444,172 B1 * | 10/2008 | Lee ............... H04M 1/6075 455/567 |
| 7,512,952 B1 | 3/2009 | Liu et al. |
| 7,577,920 B1 | 8/2009 | Hawkins et al. |
| 7,650,147 B2 | 1/2010 | Hawkins et al. |
| 7,681,146 B2 | 3/2010 | Hawkins et al. |
| 7,725,127 B2 | 5/2010 | Hawkins et al. |
| 8,208,620 B2 | 6/2012 | Hawkins et al. |
| 8,224,379 B2 | 7/2012 | Hawkins et al. |
| 8,254,565 B2 | 8/2012 | Hawkins et al. |
| 8,261,207 B2 | 9/2012 | Hawkins et al. |
| 8,433,314 B2 | 4/2013 | Hawkins et al. |
| 8,495,517 B2 | 7/2013 | Hawkins et al. |
| 8,538,478 B2 | 9/2013 | Hawkins et al. |
| 8,976,108 B2 | 3/2015 | Hawkins et al. |
| 9,203,940 B2 | 12/2015 | Hawkins et al. |
| 2001/0012000 A1 | 8/2001 | Eberhard et al. |
| 2001/0027121 A1 | 10/2001 | Boesen |
| 2002/0009192 A1 * | 1/2002 | Nakamura ......... H04M 1/0214 379/433.01 |
| 2002/0021311 A1 | 2/2002 | Shechter et al. |
| 2002/0036623 A1 | 3/2002 | Kano |
| 2002/0058533 A1 | 5/2002 | Nagel et al. |
| 2002/0063738 A1 | 5/2002 | Chung |
| 2002/0086702 A1 | 7/2002 | Lai et al. |
| 2002/0090934 A1 | 7/2002 | Mitchelmore |
| 2002/0097227 A1 | 7/2002 | Chu et al. |
| 2002/0097927 A1 | 7/2002 | Lee et al. |
| 2002/0120696 A1 | 8/2002 | Mousseau et al. |
| 2002/0126097 A1 | 9/2002 | Savolainen |
| 2002/0132633 A1 | 9/2002 | Johnson et al. |
| 2002/0158812 A1 | 10/2002 | Pallakoff |
| 2002/0186262 A1 | 12/2002 | Itavaara et al. |
| 2003/0001816 A1 | 1/2003 | Badarneh |
| 2003/0060900 A1 | 3/2003 | Lo et al. |
| 2003/0123627 A1 | 7/2003 | Pinard et al. |
| 2004/0047505 A1 | 3/2004 | Ghassabian |
| 2004/0070567 A1 | 4/2004 | Longe et al. |
| 2005/0044395 A1 | 2/2005 | Staring et al. |
| 2005/0153729 A1 * | 7/2005 | Logan ............... G08B 13/1427 455/550.1 |
| 2006/0095849 A1 * | 5/2006 | Vertaschitsch ...... G06F 3/04886 715/717 |
| 2007/0188448 A1 | 8/2007 | Hawkins et al. |
| 2012/0244915 A1 | 9/2012 | Hawkins et al. |
| 2015/0143278 A1 | 5/2015 | Hawkins et al. |
| 2016/0080541 A1 | 3/2016 | Hawkins et al. |
| 2016/0081017 A1 | 3/2016 | Hawkins et al. |

FOREIGN PATENT DOCUMENTS

| | | |
|---|---|---|
| EP | 0611239 A1 | 8/1994 |
| EP | 0813328 A2 | 12/1997 |

(56) References Cited

FOREIGN PATENT DOCUMENTS

| EP | 0898222 A1 | 2/1999 |
|---|---|---|
| EP | 0840934 B1 | 4/1999 |
| EP | 0933908 A2 | 8/1999 |
| EP | 1071029 A2 | 1/2001 |
| EP | 1218814 B1 | 4/2003 |
| JP | H10215299 A | 8/1998 |
| KR | 100691359 | 2/2007 |
| WO | WO-9410678 A1 | 5/1994 |
| WO | WO-9416408 A1 | 7/1994 |
| WO | WO-9601453 A1 | 1/1996 |
| WO | WO-0065445 A1 | 11/2000 |
| WO | WO-0118638 A1 | 3/2001 |

OTHER PUBLICATIONS

At Last, Technology Hamesse [sic] One of the Most Powerf [sic] Forces known to Man., Foster City, GO Corporation, 1991, 14 pages.
AT&T New Release, NCR Cuts Price of 3170 Notebook Computer 11 to 19 Percent [online]. (Mar. 8, 1993), Retrieved from the Internet: <URL:http:>2 pages.</URL:http:>.
Barnett S., "VisorPhone: Phone and PDA Merge Into One," Pen Computing Magazine, Jan. 22, 2001, 6 pages, [Online] [Retrieved on Jul. 16, 2009] Retrieved from the Internet<URL:http://www.pencomputing.com/palm/Pen38/visorphone.html>- ;other.
Basterfield D., "The IBM PalmTop PC110," Jan. 30, 2000, pp. 1-3.
Bedell, Doug, Newspaper article: "Ways to Escape Multiple-Remote Hell", San Jose Mercury News, Jun. 14, 2001.
BlackBerry Desktop Software Installation and Getting Started Guide, Feb. 5, 1999.
BlackBerry Developer's Guide SDK User's Guide Version 2.0 (Data TAC), Jun. 12, 2000.
BlackBerry Enterprise Server Software Installation and Getting Started Guide, Aug. 29, 1999.
BlackBerry Enterprise Server Software Installation and Getting Started Guide, Sep. 29, 1999.
Blackberry Handheld Installation & Getting Started Guide, © 2002 Copyright by Research in Motion Limited, 295 Philip Street, Waterloo, Ontario, Canada N2L 3W8. Revised Feb. 27, 2003, pp. 39-41. (www. rim.net).
BlackBerry Handheld Users Guide, Aug. 7, 1999.
BlackBerry Handheld Users Guide, Sep. 7, 1999.
Carr, R.M., The Point of the Pen, Byte (Feb. 1991, Reprinted), 10 pages.
Choi, H., "First Look: Samsung 1300 Cellphone/PDA", [online] Mar. 28, 2001 [Retrieved on Oct. 26, 2001], Retrieved from the Internet: <URL: http:// www.techtv.com> 2 pages.
Compaq Product Information, iPAQ Pocket PC Options, [online] [Retrieved on Nov. 13, 2001], Retrieved from Internet: <URL: http://www.compaq.com/products/handheldsjpocketpcioptions/expansion packs.html>.
Cullen, A., Connecting With Your EO Cellular Module, Mountain View, EO, Inc., 1992, 1993, pp. ii-33.
Cullen, A., Getting Started With Your EO Personal Communicator, Mountain View, EO, Inc., 1992, 1993, pp. ii-74.
Cullen, A., Lookup Guide to the EO Personal Communicator, Mountain View, EO, Inc., 1992, 1993, pp. ii-320.
Disabatino J., "Hands Full of Information," Computerworld, Nov. 6, 2000, vol. 34 (45), p. 68.
Filing of translation of European Patent (UK) under Section 77(6)(a), European patent No. 1218814, Apr. 9, 2003, 13 pages.
Go Corporation Information Statement, (Nov. 8, 1993), 114 pages.
Handspring, "Sprint and Airprime Delivery First Wireless CDMA Phone and Data Module for the Handspring Visor," [online] Aug. 2, 2001 [Retrieved on Aug. 6, 2001], Retrieved from the Internet: <URL: http://www.handspring/pr59.jhtmljsessionid=GRHGIYCHDOKZ1QFIAEOSFFGAVAATMIV>.
Handspring Product Information: "VisorPhone The Springboard Module that Transforms your Visor into an Extraordinary Phone," 2000, 2 pages.
Handspring VisorPhone Module User Guide, (2000-2001), 76 pages.
IBM Selects Racotek Data/voice Communications Services to Interface With Touchmobile Product, PR Newswire (Jan. 25, 1993), 2 pages.
IBM Technical Disclosure Bulletin: "Simple User Interface to Cellular Telephone," [online] Oct. 1995 [Retrieved on Jul. 5, 2001] Retrieved from the Internet, pp. 349-350.
IBM Technical Disclosure Bulletin: Inexpensive Personal Digital Assistant, Apr. 1995, pp. 525-526, [retrieved Jul. 5, 2001], retrieved from internet.
IBM Technical Disclosure Bulletin: Inexpensive Personal Digital Assistant, retrieved from internet, Apr. 2001.
IBM Technical Disclosure Bulletin: SimpleUser Interface to a Cellular Telephone, retrieved from internet, Oct. 2001.
IBM's Touchmobile Helps Field Workers Collect Data at the Touch of a Finger, PR Newswire (Jan. 26, 1993), 2 pages.
IBM TouchMobile Information and Planning Guide, International Business Machines Incorporated (Mar. 1993), 20 pages.
IBM TouchMobile Solution for Data Capture and Communication, Keeping Your Business Moving in the 90s, International Business Machines Incorporated (Jan. 1993), 13 pages.
Kyocera's Smartphone Series, 2001, Retrieved from the Internet: <URL: http://www.kyocera-wireless.com>.
MacNeill, D., Messaging Card and NewtonMail: We Pick Up and Deliver, on the Go Magazine [online]. (Oct. 13, 1993), Retrieved from the Internet: <URL:http://www.pencomputing.com/Newton/NewtonNotes2.html < 2 pages.
Macneill, D. "Wireless Newton Technology Goes to Work", On the Go Magazine, Oct. 13, 1993, 2 pages, http://www.pencomputing.com/Newton/NewtonNotes2.html.
MacNeill, D., Wireless Newton Technology Goes to Work, On the Go Magazine [online]. (Sep. 8, 1993), Retrieved from the Internet: <URL:http://www.bencomputing.com/Newton/NewtonNotes1.html>, 2 pages.
Maki, K., The AT&T EO Travel Guide, N.Y., John Wiley & Sons, Inc., 1993, pp. iii-555.
Microsoft, "The Windows Interface and Application Design Guide," 1987, pp. 84-87, Figures 1-6.
Mossberg, W., Samsung Embeds Cellphone Inside Palm in New I300 Device, Aug. 30, 2001, [retrieved Oct. 26, 2001], retrieved from internet http://www.ptech.wsj.com/archive/ptech-20010830.html.
Motorola Inc., "Motorola V60i Wireless Phone User Manual, Personal Communications Sector", 600 North U.S. Highway 45, Libertyville, Illinois (www.motorola.com), pp. 20-22, Feb. 24, 2006. URL=http://i.motorola.com/mdirect/manuals/v60i_TDMA User Manuale.pdf.
Motorola Model 009 "Let's Start" Guide, pp. 1, 3, 11, 2001.
Motorola Model 009 User's Guide, pp. 1, 3, 22, 23, 80. 2002.
Motorola Model V100 User's Guide, pp. 1, 2, 17-19, 33. 2001.
Motorola Series 60g Wireless Phone User Manual, 0 2001 Motorola, Inc., published by the Personal Commuunications Sector, 600 North U.S. Highway 45, Libertyville, Illinois (www.motorola.com), pp. 1-3.
Newton MessagePad Handbook, © 1994 Apple Computer, Inc., 1 Infinite Loop, Cupertiono, CA, pp. 14-19, 22nd 23. (www.apple.com).
Nokia 9110 Accessories Quick Guide Instruction Manual, 1999.
Orubeondo A., The new shape of mobile communication, InfoWorld, Apr. 23, 2001, pp. 65-66.
Palencher, J., "New Phones Deliver PIM Function," Twice, Oct. 9, 2000, p. 44.
Photograph of Motorola 009 from 3GNewsroom.com.
Pinkerton J., Wireless meets computing again, Dealerscope, Nov. 2000, vol. 42 (11), pp. 34-35.
Progue D, "PalmPilot: The Ultimate Guide," O'Reilly, 2nd Edition, Chapter 1-4, 1999.
Schlender, B. R., Hot New PCs That Read Your Writing, Fortune (Feb. 11, 1991, Reprinted), 6 pages.

(56) References Cited

OTHER PUBLICATIONS

Sprint PCS User Guide—Samsung Model SCH-8500, 1999.
Stock, R., The World of Messaging an Introduction to Personal Communications, Mountain View, EO, Inc., 1992, 1993, pp. ii-69.
SyncML Consortium: "SyncML Sync Protocol, Version 1.0" (Dec. 7, 2000), Chapters 1,2,5-8.
SyncML Consortium: "SyncML Sync Protocol, Version 1.0.1" (Jun. 15, 2001).
SyncML Website Introduction Page, SycnML Initiative LTD., [Retrieved on Oct. 24, 2002]. Retrieved from the Internet: <URL: http://www.syncml.org/about-intro.html>, 2 pages.
Tam, P., "Palm, Motorola to Make PDA Cell Phones", [online] Sep. 25, 2000, [Retrieved on Jun. 19, 2001], Retrieved from the Internet: <url: />.
Technical White Paper BlackBerry Enterprise Server for Microsoft Exchange, Version 2.1, (1997-2001).
Tucows PDA Phone GSM Dailer: GSM Dailer 1.0, Nov. 30, 2000, [Retrieved on Jun. 19, 2001], Retrieved from the Internet: <URL: http://pds.rcp.net/pe/pocket/preview11.54208.htrol>.
United States Court of Appeals for the Federal Circuit: Wireless Agents LLC v. Sony Ericsson Mobile Communications AB and Sony Ericsson Mobile Communications (USA), Inc., Decided Jul. 26, 2006, 7 pages.
User's Guide, hp iPAQ Pocket PC h4000 Series, Document Part No. 343434-001, Aug. 2003, 144 pages.
WAP "Push Message," Version 22—Mar. 2001, Wireless Application Protocol, WAP-251—PushMessage—20010322-a, pp. 1-14.
Wireless Application Protocol, Service Indication, WAP-167-ServiceInd-20010731-a, Version Jul. 31, 2001, 28 pages.
Wireless Application Protocol, Service Loading, WAP-168-Service Load-20010731-a, Version Jul. 31, 2001, 18 pages.
Wireless Application Protocol, WAP—Sync—Spec, Data Synchronisation Specification, WAP—234—SYNC—20010530-a, Version 30-May 2001, 11 pages.
Wireless Application Protocol, Wireless Application Protocol, Wireless Markup Language Specification Version 1.3, WAP WML, WAP—191—WML, Feb. 19, 2000, 110 pages.

\* cited by examiner

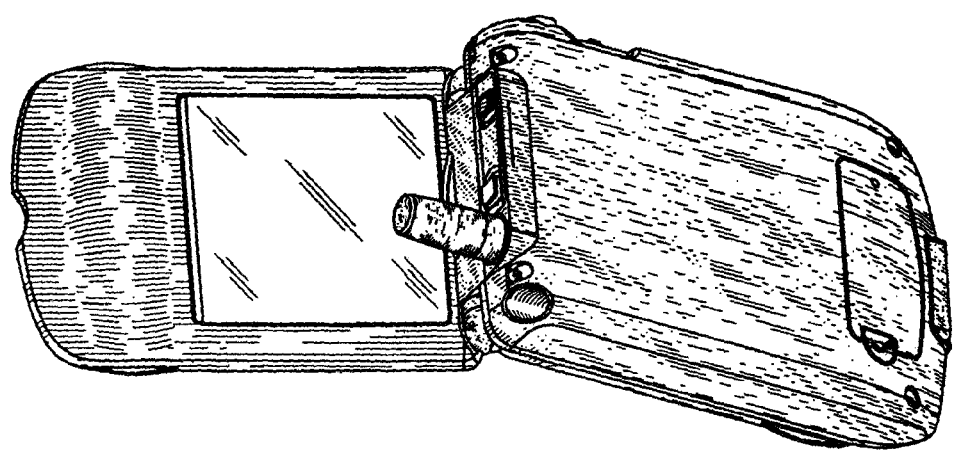
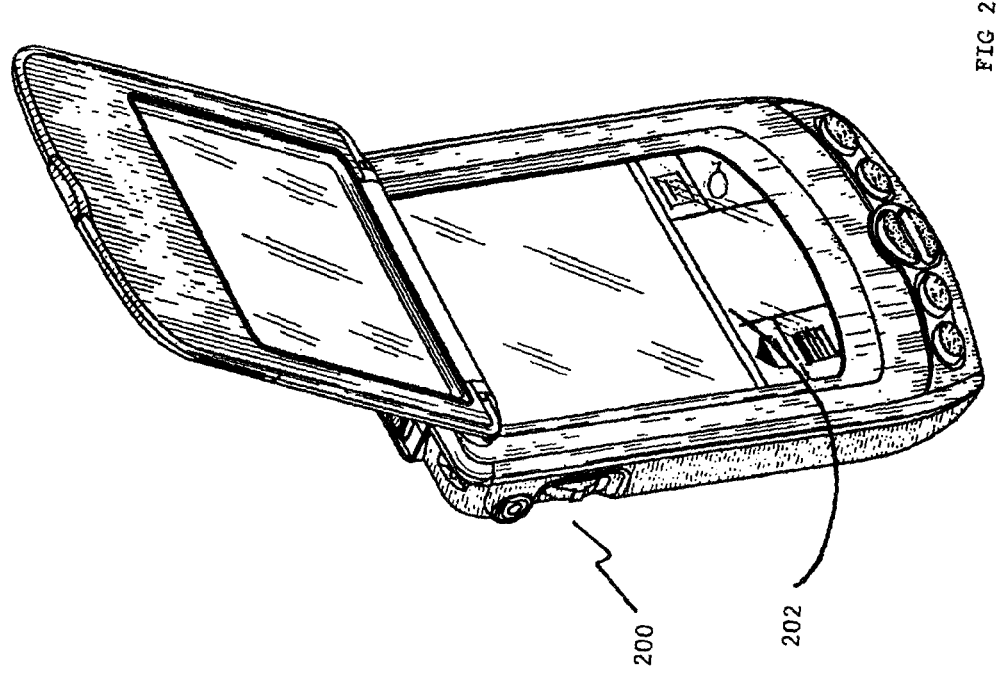
FIG. 2

| Action | Device Power Off (include Active Headset Call) | Device Power On | | | | |
|---|---|---|---|---|---|---|
| | | Incoming Call | | Active Call | | Other |
| | | Within 1s of Notification | After 1s of Notification | No Headset | Headset | |
| Opening the Lid | Turns device on, Launches the app assigned to the lid | Nothing | Answers call | N/A | Nothing | Nothing |
| Closing the Lid | Nothing | Nothing | Silences ring, Ignores call, Turns device off | Displays 2-second hang up confirmation, Hangs up, Turns device off | Turns device off, Does not hang up | Turns device off |

Lid Matrix

FIG. 5

Legend

| Shifted Character | Option Character |
|---|---|
| | Normal Character |

Complete Keyboard Layout

| Q | W | E | R | T | Y | U | I | O | P |
|---|---|---|---|---|---|---|---|---|---|
| Cntrst | @ | $ | / | * | 1 | 2 | 3 | # | " |
| q | w | e | r | t | y | u | i | o | p |

| A | S | D | F | G | H | J | K | L | N/A | N/A |
|---|---|---|---|---|---|---|---|---|---|---|
| % | ( | ) | - | + | 4 | 5 | 6 | ' | Backspace ||
| a | s | d | f | g | h | j | k | l | N/A | N/A |

| N/A | N/A | Z | X | C | V | B | N | M | . | N/A |
|---|---|---|---|---|---|---|---|---|---|---|
| Option || : | ! | ? | , | 7 | 8 | 9 | . | N/A |
| | | z | x | c | v | b | n | m | | |

| Find | Shift | N/A | Tab | Space | N/A | ListType | Launcher | Menu/Command |
|---|---|---|---|---|---|---|---|---|

Keyboard Layout of Device 100

FIG. 6a

Punctuation/Symbol/Number Layout

| Contrast | @ | $ | / | * | 1 | 2 | 3 | # | " |
|---|---|---|---|---|---|---|---|---|---|
| % | ( | ) | - | + | 4 | 5 | 6 | ' | Back |
| Opt | . | ! | ? | , | 7 | 8 | 9 | . | Return |
| Shift | | | | Space | | | | Menu/Command | |

Punctuation/Symbol/Number Layout of Device 100

FIG. 6b

INTEGRATED PERSONAL DIGITAL ASSISTANT DEVICE

CROSS-REFERENCE TO RELATED APPLICATIONS

This application is a continuation of U.S. patent application Ser. No. 13/117,729, filed on May 27, 2011, which is a Continuation of U.S. Pat. No. 8,224,379, filed on Jun. 27, 2008, which is a Continuation of U.S. Pat. No. 7,395,089, filed on Oct. 12, 2001, which claims priority and benefit under 35 USC §119(e) to U.S. Provisional Patent Application No. 60/297,817, filed on Jun. 11, 2001, each of which is incorporated herein by reference in its entirety.

FIELD OF INVENTION

The present invention is related generally to a user interface for a personal digital assistant device.

DESCRIPTION OF RELATED ART

Carrying a personal digital assistant (PDA) around is very convenient for tasks such as taking notes at a meeting or lecture, scheduling appointments, looking up addresses, and for performing a whole host of other functions. However, one function not easily performed with a PDA is that of telecommunications. A typical cellular telephone, meanwhile, offers a range of features, from speed dial to speakerphone to caller-ID, phonebook, etc. In order to have the functionality of a cellular telephone and the functionality of a PDA, consumers have generally had to choose from a selection of largely unsatisfactory options. The most common option is to carry both a PDA and cell phone. This is undesirable, however, because of the obvious impractical aspects of having to deal with two separate devices, both in terms of sheer bulk as well as the inconvenience of switching between units. Simply put, there are more things to buy, more things to break, and more things to lose.

Another option is to purchase an add-on telephone device for a PDA. While this option is preferable to carrying two devices around, it still has limitations. For example, an add-on telephone device adds bulk to and changes the form factor of the PDA. In addition, since such a PDA must be designed to operate without an add-on telephone, the degree to which the user interface of the PDA can be integrated with the user interface of the add-on telephone is limited. Thus, an add-on solution is of only limited value, since there is not a true integration between the cellular telephone device and the PDA, but rather two separate devices at best co-existing side-by-side.

Accordingly, what is needed is a system and method for providing a user interface to a device featuring integrated functionality of both a PDA and cellular telephone.

SUMMARY

In accordance with the present invention there is provided a system and method for using an integrated device featuring functionality of both a PDA and cellular telephone. Features of the present invention include a power button offering control of both the computing and telephony functions of the device; a lid that turns the device on and off depending on its state, and can also be used to begin and terminate calls; a jog rocker that activates the device and is used to select from a variety of menu options; application buttons that offer direct access to applications stored on the device, and which can be configured to operate in conjunction with secondary keys to offer added functionality; an override-able ringer switch; a keyboard; and an Auto Word Completion function that verifies and corrects a user's typing in real time.

BRIEF DESCRIPTION OF THE DRAWINGS

FIG. 2 is an illustration of a device without keyboard in accordance with an embodiment of the present invention.

FIG. 5 is an illustration of a matrix describing behavior of a lid attached to a device in accordance with an embodiment of the present invention.

FIGS. 6a and 6b are illustrations of a keyboard layout in accordance with an embodiment of the present invention.

DETAILED DESCRIPTION

In the discussion set forth below, for purposes of explanation, specific details are set forth in order to provide a thorough understanding of the invention. It will be appreciated by those skilled in the art that the present invention may be practiced without these specific details. In particular, those skilled in the art will appreciate that the methods described herein can be implemented in devices, systems and software other than the examples set forth. In other instances, conventional or otherwise well-known structures, devices, methods and techniques are referred to schematically or shown in block diagram form in order to facilitate description of the present invention.

The present invention includes steps that may be embodied in machine-executable software instructions, and includes method steps that are implemented as a result of one or more processors executing such instructions. In other embodiments, hardware elements may be employed in place of, or in combination with, software instructions to implement the present invention. The software instructions may be stored in RAM or ROM, or on other media including removable media.

Figure 1:
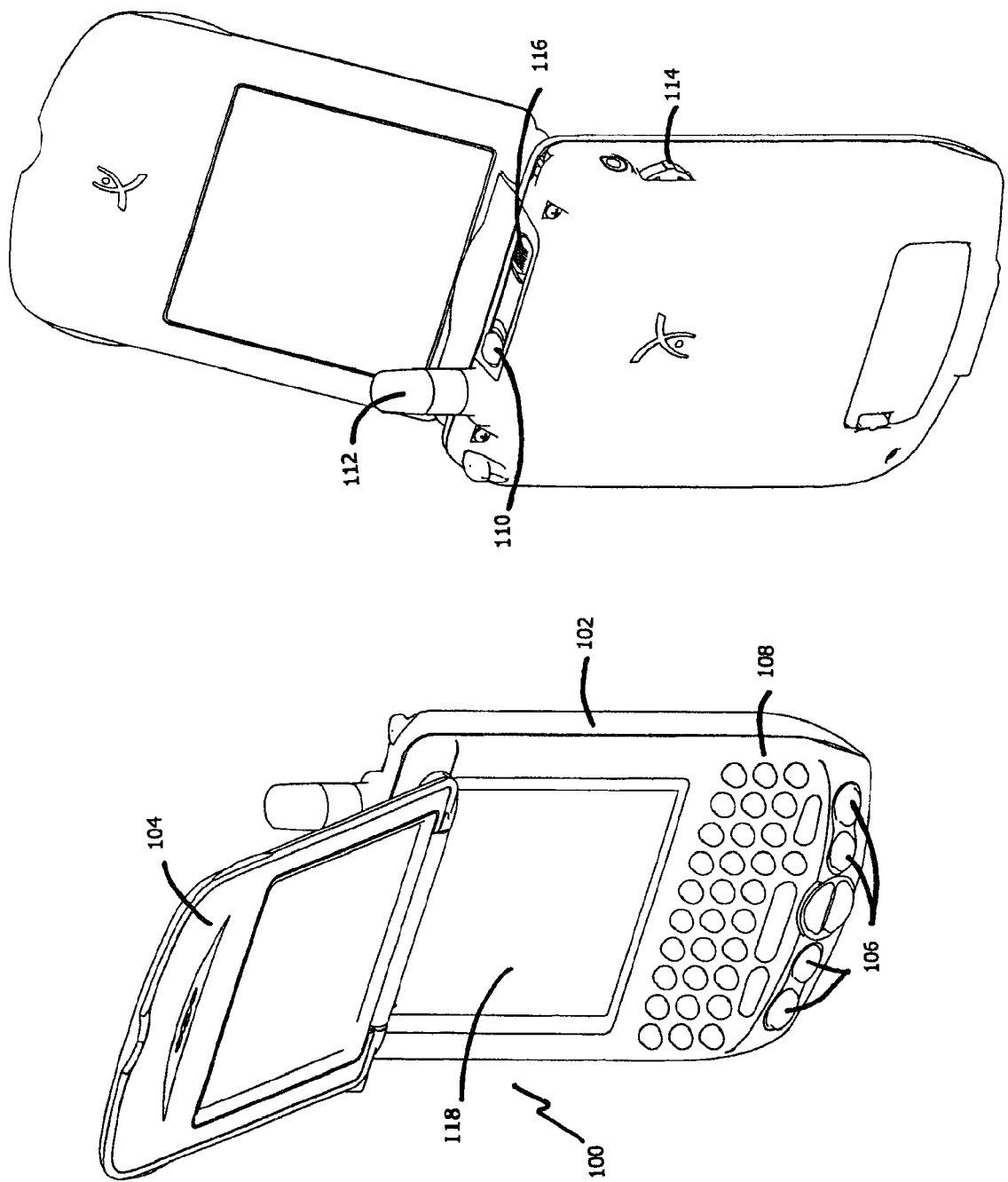
FIG. 1 is an illustration of a device with keyboard in accordance with an embodiment of the present invention.

The present invention includes a user interface for the operation of an integrated handheld personal computing device and wireless communication device. Referring now to FIG. 1, there is shown an example of such an integrated device 100. As illustrated in FIG. 1, device 100 includes a base section 102, a lid 104, application and scroll buttons 106, power button 110, antenna 112, jog rocker 114, and ringer switch 116, and display 118. In addition, device 100 includes a keyboard 108. As will be appreciated by those of skill in the art, the present invention may exist in a variety of embodiments, including embodiments in which the integrated device includes more or fewer physical components than are illustrated in FIG. 1. For example, FIG. 2 illustrates another device 200 that does not have a keyboard, but instead has a writeable area 202 enabling input to the device 200 via, for example, a stylus. For convenience and clarity, device 100 of FIG. 1 serves as the illustration that will be referenced throughout this specification, but such reference should in no way be understood to restrict what is disclosed to such an embodiment.

Figure 10:
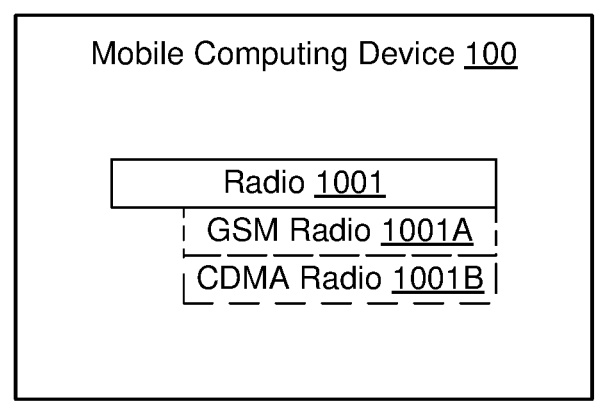
FIG. 10 depicts a device in accordance with an embodiment of the present invention.

As shown in FIG. 10, Mobile Computing Device 100 includes a radio 1001, which may be an integrated GSM radio 1001A (also referred to as a cellular telephone), and while in alternative embodiments is of varying sizes and shapes, in one embodiment the device 100 is designed to fit comfortably in a pocket. While the radio 1001 uses the GSM standard in one embodiment, in alternative embodiments the radio 1001 may be a CDMA radio 1001B, using the CDMA standard, or may be a radio using any of a variety of other well-known wireless standards.

Power Button

Device 100 has a power button 110, located in one embodiment on the top face, next to the antenna 112. In one embodiment, the power button 110 performs the following functions:

A single press and release of the power 110 button toggles device 100 on/off.

Pressing and holding the power button 110 toggles the radio on/off.

Double-tapping the power button 110 toggles a backlight on/off.

Triple-tapping the power button 110 inverts the display 118 and insures that the backlight is on.

A single press of the power button 110 when an incoming call is ringing silences the ring but does not turn off the device 100.

Figure 3:
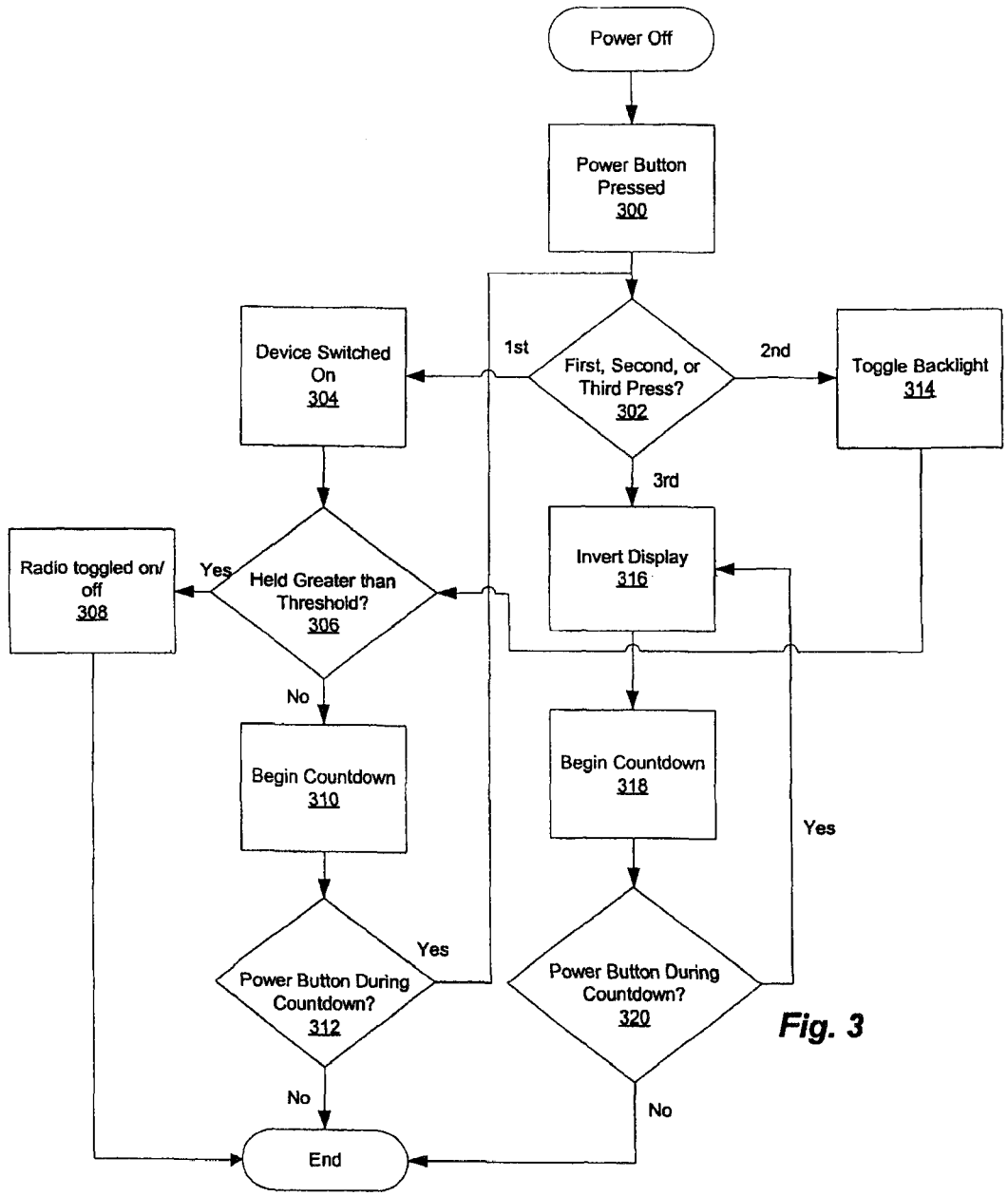
FIG. 3 is a flow chart illustrating power-on behavior of a device in accordance with an embodiment of the present invention.

Referring now to FIG. 3, there is shown a flowchart of the operation of the power button functionality starting from a device-off state. Initially, the device 100 is off and the power key is pressed 300. If the key is being pressed for the first time within a given period 302 (e.g., it has not been pressed for at least the previous half second), the device 100 is switched on 304. If the power button is held down for longer than a threshold amount of time, e.g., 1 second 306 then the radio is toggled on or off 308. If the power button is held down for less than the threshold amount 306, then upon release a countdown of predetermined length, e.g., ½ second, is begun 310. If the power button is pressed 312 during the countdown, then the backlight is toggled on or off 314. If the cycle is repeated and the power button is pressed for a third time during the countdown 312, then the display 118 is inverted 316, and the backlight is preferably turned on if it is not already on. If the power button is not pressed 312 during the countdown, then no additional actions take place as a result of the power button press. After the display is inverted in step 316, the countdown is once again begun 318. However, if the power button is pressed during this or subsequent countdowns 320, the display is again inverted at step 316. This countdown cycle continues until the power button is not pressed during the countdown 320.

Figure 4:
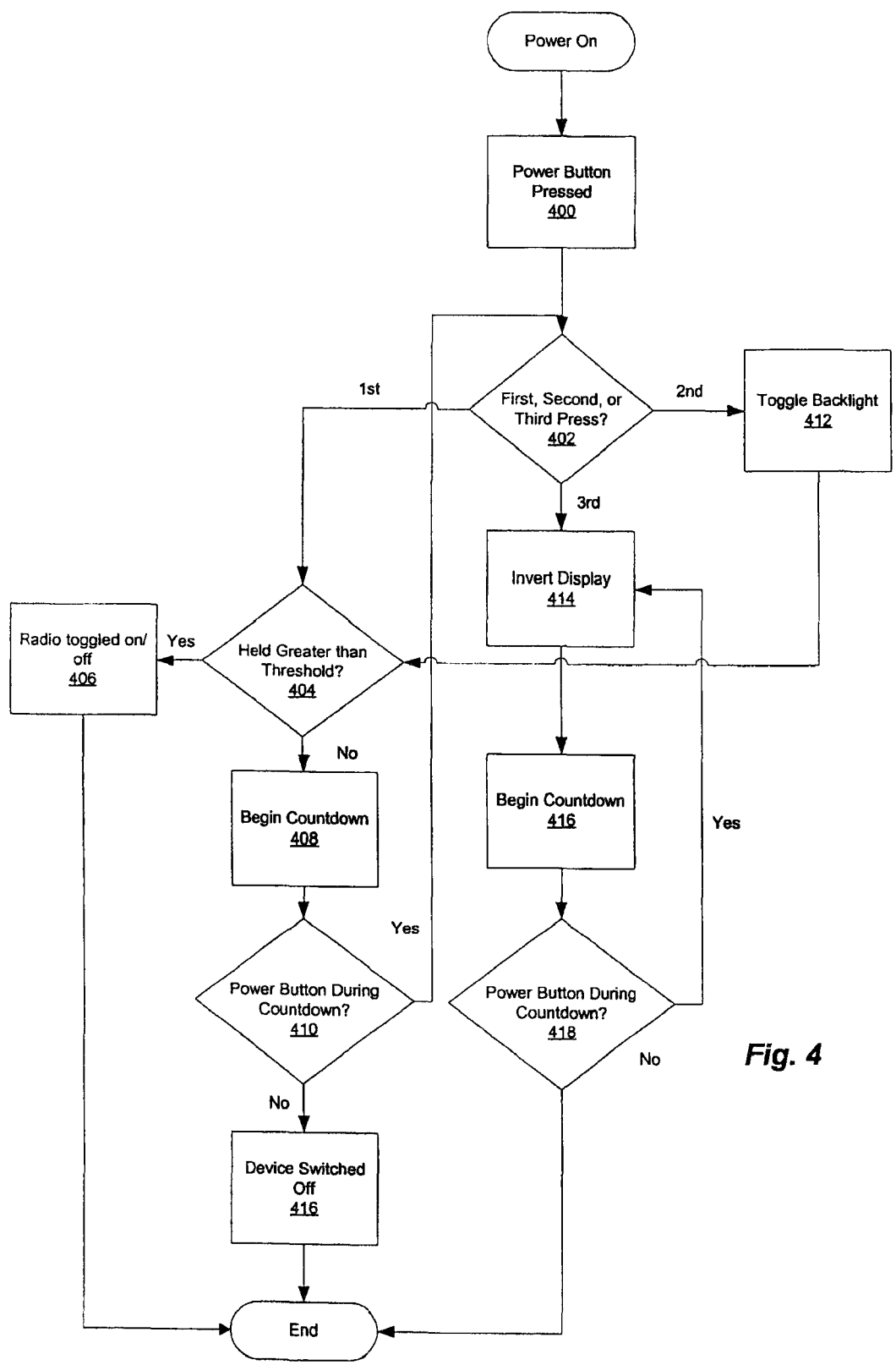
FIG. 4 is a flow chart illustrating power-off behavior of a device in accordance with an embodiment of the present invention.

Referring now to FIG. 4, there is shown a flowchart of the operation of the power button functionality starting from a device-on state. Initially, the device is on, and the power key is pressed 400. If the power key is being pressed for the first time 402 (e.g., it has not been pressed for at least the previous half second), no action is initially taken. If the power button is held down for longer than a threshold amount of time, e.g., 1 second 404 then the radio is toggled on or off 406. If the power button is held down for less than the threshold amount 404, then upon release a countdown of predetermined length, e.g., ½ second, is begun 408. If the power button is not pressed 410 during the countdown, then the device is turned off 416. If the power button is pressed 410 during the countdown, then the backlight is toggled on or off 412. If the cycle is repeated and the power button is pressed for a third time during the countdown, then the display is inverted 414, and the backlight is turned on if not already on. After the display is inverted 414, another countdown is begun 416. If the power button is pressed again 418 during the countdown, then the display is once again inverted 414, and countdown 416 restarted. This continues until the countdown expires without the power button being pressed 418.

Figure 9:
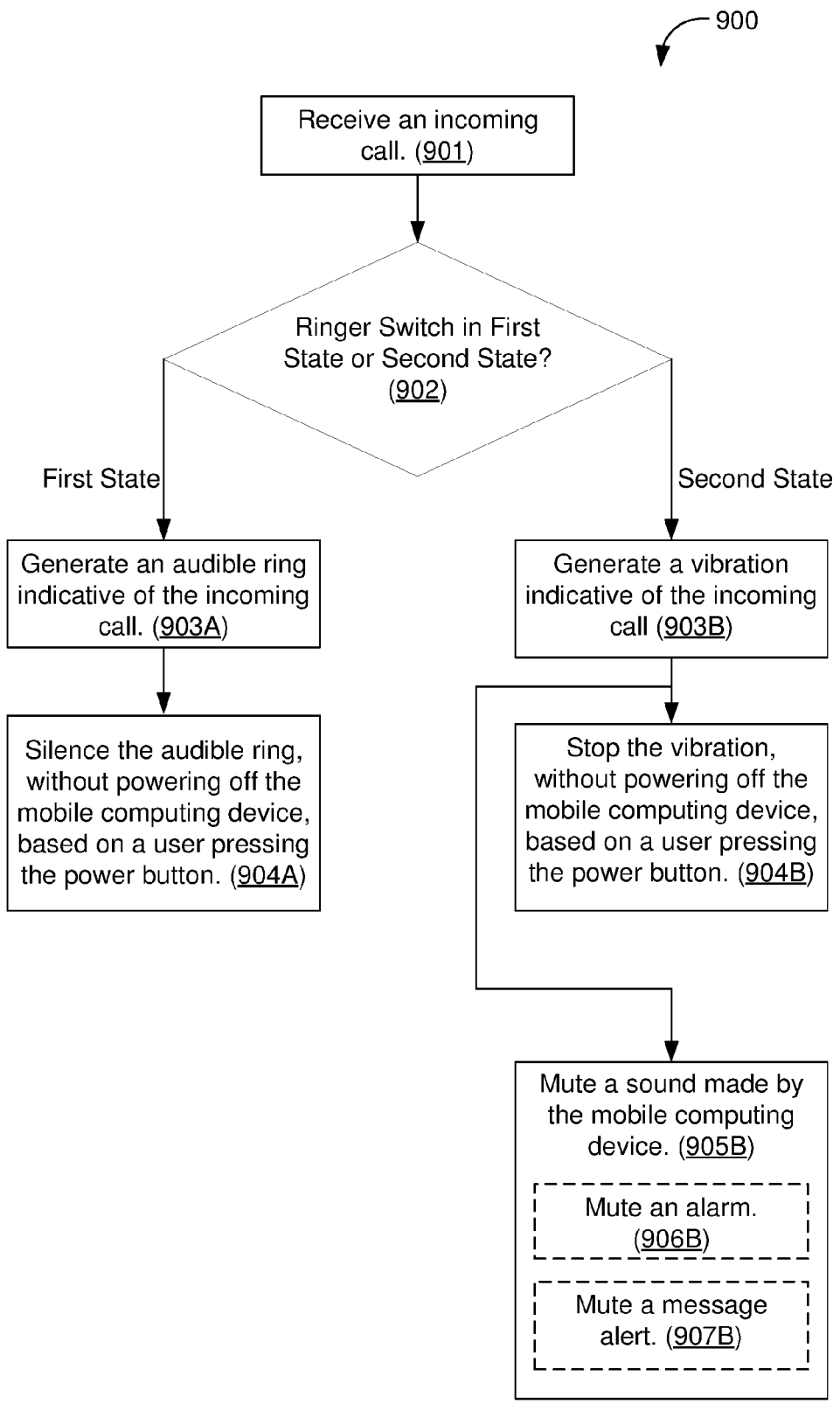
FIG. 9 is a flow chart illustrating incoming call indication behavior of a device in accordance with an embodiment of the present invention.

In addition, in one embodiment pressing the power button 110 when there is an incoming call silences the ring or vibrate without turning off the device 100. For example, referring also to operation 900 of FIG. 9, the device 100 may silence the audible ring without powering off the device 100 based on a user pressing the power button 110 (904A), and may stop the vibration without powering off the device 100 based on the user pressing the power button 110 (904B). Further, if a call is in progress, pressing the power button 110 turns off the device 100 but does not terminate the call. Finally, if the device 100 is off when a call comes in, the device 100 is turned on, and the backlight is illuminated, which helps to locate the device 100, e.g., in a poorly-lit room.

Lid

Referring again to FIG. 1, there is shown a view of device 100, having a lid 104 attached to base 102. In FIG. 1, lid 104 is connected to base 102 via a hinge or other mechanism that allows lid 104 to open and close. Note that the lid 104 may be connected to base 102 in any of a variety of ways while still including features described herein. The particular embodiment of FIG. 1 is therefore meant to illustrate only one of many possible configurations.

In one embodiment, lid 104 features a hardware switch for lid open and lid close detection, and may additionally include an integrated speaker for flip phone-like functionality. When closed, in one embodiment, lid 104 covers all of base 102 except for application and scroll buttons 106. In one embodiment, lid 104 also includes a transparent window for viewing the display 118 of device 100 while the lid 104 is closed.

The effect of opening and closing the lid 104 varies according to the state of device 100 at the time the lid 104 is opened or closed. In one embodiment, and referring now to FIG. 5, opening and closing the lid 104 has the following effect:

If the device is off, opening the lid turns on the device 100, and launches 502 a predetermined application. In one embodiment, the predetermined application is a speed dial view of a telephone application, however in other embodiments the application can be any application on the device 100, assignable by the user in one embodiment via a preferences control panel-type application. If the device is off, closing the lid has no effect 504.

If the device is on, then it is in one of three states: either a call is in progress, a call is incoming, or there is no call activity.

Figure 8:
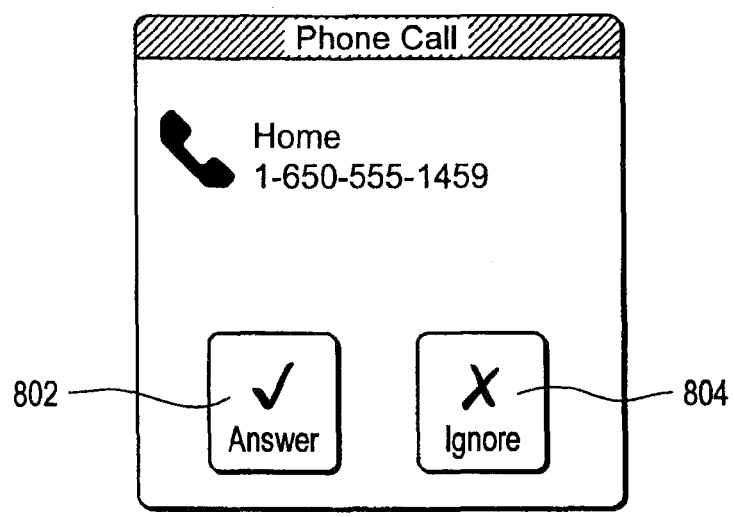
FIG. 8 is an illustration of a dialog box presented to a user when a call is incoming in accordance with one embodiment of the present invention.

If a call is incoming, then an incoming call notification is given to the user. An illustration of such a notification is shown in FIG. 8. It will be appreciated that a user may be in the process of opening the lid when a call comes in. In such a situation, the user may not want to actually take the incoming call. For that reason, if the lid is opened within, in one embodiment, one second of the incoming call notification, no action is taken 506 (although the user can still answer the call in other ways, e.g., by tapping a dialog box 802 on the display of device 100). In other embodiments, the time maybe shorter or longer than one second. If the lid is opened more than one second after the initial incoming call notification, then the call is answered 508. Note also that in one embodiment a user can choose to accept or ignore any incoming telephone call by selecting the answer 802 or ignore 804 options presented in a popup dialog box.

Similarly, if the user is in the process of closing the lid when a call comes in, it is desirable to assume that the lid is being closed not in response to the incoming call, but rather by coincidence. Thus if the lid is closed within an initial time, e.g., one second, of the first notification of an incoming call, no action is taken 510. After this initial period, if the lid is closed, then in one embodiment the ring is silenced, the call is ignored, and the device is turned off 512.

During an active call, the lid is open in a preferred embodiment, unless a headset is plugged in. If a call is in progress and the headset is being used, then opening the lid has no effect on the call 514. If the lid is closed while a headset call is in progress, the device is turned off, but the call is not disconnected 516. If a telephone call is in progress without using a headset, then closing the lid hangs up the telephone, in one embodiment after displaying a warning message confirming that the call is about to be disconnected, and turns the device off 518. During the confirmation warning message, the user has the opportunity to tell the device not to disconnect the call, e.g. by pressing the scroll-up button. In alternative embodiments, the call is disconnected as soon as the lid is closed.

If a telephone call is not in progress, then in one embodiment, opening the lid when the device is already on has no effect 520. That is, even if there is an application assigned to be launched upon the opening of the lid, when the power is already on, opening the lid does not launch the assigned application, but rather has no effect on what application is currently executing. Also, in one embodiment, if a call is not in progress, closing the lid turns the device off 522.

In addition, in one embodiment keyboard 108 is deactivated when the lid 104 is closed, whether the device 100 is on or off. This guards against inadvertent input to the device when pressure is applied to the lid, e.g., if the device is carried in a pocket, or if something heavy is placed on top of the device. In alternative embodiments, the keyboard 108 remains active at all times regardless of lid position. In one embodiment, application and scroll buttons 106 remain active even when the lid 104 is closed. This allows the scroll buttons to be used to respond to dialog boxes that may be presented to the user when the lid is closed. For example, if an alarm goes off, the user can dismiss the alarm by pressing a scroll button, instead of having to open the lid to tap the display 118 or press a button on the keyboard 108.

Jog Rocker

Device 100 includes a jog rocker 114 such as is pictured in FIG. 1. A jog rocker in one embodiment allows four input actions: up, down, press in, and press and hold.

While individual applications provide specific responses to input from jog rocker 114, in one embodiment pressing the jog rocker 114 when device 100 is turned off wakes device 100 up and launches a predefined application, such as the phone application in one embodiment.

In one embodiment, this behavior is executed on jog rocker 114 press, not release, so one embodiment, this behavior is executed on jog rocker 114 press, not release, so that a press and hold of the jog rocker 114 wakes the device up, launches the predefined application on the press, and then executes within the application whatever that application has specified for a jog rocker 114 hold on the hold.

In another embodiment, jog rocker 114 can be used to provide a scroll-up and scroll-down function similar to that provided by scroll buttons 106. In one embodiment this is the default use for jog rocker 114 when an application does not provide additional functionality for the jog rocker.

Ringer Switch

Ringer switch 116 is used in a preferred embodiment to select whether incoming telephone calls should produce an audible ringing sound on device 100. In a first position, device 100 produces such a ring tone, which is customizable in one embodiment using application software stored on device 100. In a second position, device 100 does not produce a ring tone for an incoming call. In one embodiment, device 100 is configured to vibrate in response to an incoming telephone call. For example, referring also to FIG. 9, the device 100 may receive an incoming call (901), and based on whether the ringer switch 116 is in a first state or a second state (902), the device 100 may generate an audible ring indicative of the incoming call (903A) or generate a vibration indicative of the incoming call (903B). The vibrate feature of device 100 may additionally be activated by applications executing on device 100, for example even when ringer switch 116 is in the first position (the audible ring position).

In one embodiment, when ringer switch 116 is in the second position, all sounds made by device 100 are muted, and not just the ring tone. Thus, for example, while a number of applications executed on device 100, e.g., an alarm, a message alert, etc., may instruct device 100 to produce a sound, the location of the switch 116 in the second position will stop device 100 from actually making the sounds. Referring also FIG. 9, the device 100 may mute a sound made by the device 100 (905B), which may include muting an alarm (906B) or muting a message alert (907B). In yet another embodiment, device 100 allows software resident on device 100 to override the physical setting of ringer switch 116. This may be of particular use, for example, if the ringer switch 116 is in the first position while a call is in progress and it is undesirable to have sounds from device 100 interfering with the call in an annoying fashion.

Application Buttons

A device such as device 100 typically has one or more application and scroll buttons 106 located physically on the device, providing direct access to applications associated with the buttons, as well as up-down and left-right scroll functionality. Using a keyboard 108 of device 100, different applications are assignable to the application buttons 106 being pressed in combination with a modifier key. In one embodiment, an "option" key is the modifier key for these key combinations.

In one embodiment, the following applications are mapped to option and ("+") application button combinations:

Option+Phone Application button maps to Memo Pad.
Option+Calendar Application button maps to To-Do.
Option+Internet Browser Application button maps to CityTime.
Option+Messaging Application button maps to the calculator.

In one embodiment, the Option+Application button key combination works both in series and in parallel. For example, pressing and releasing the Option button (a serial combination), then pressing an application button 106 launches the application that is mapped to that application button's option modification. Similarly, pressing and holding the Option button while pressing the application button 106 (a parallel combination) also launches that application button's option modification.

If the option modification times out before the application button 106 is pressed, then the functionality is the same as if only the application button had been pressed.

Pressing and holding Option, and then pressing an application button 106 while Option is still held down also launches the application that is mapped to that applications button's option modification. What occurs if the user continues to hold the application button in is controlled on an application-by-application basis.

In one embodiment, the following application buttons 106 and combinations are mappable:
   a Phone Application button
   a Calendar Application button
   an Internet Browser Application button
   a Messaging Application button
In alternative embodiments, the following combinations are also mappable:
   Option+Calendar Application button
   Option+Phone Application button
   Option+Internet Browser Application button
   Option+Messaging Application button
Keyboard In one embodiment, keyboard 108 includes the following keys:
   a-z (26 keys)
   . (period)
   Symbol key
   Space
   Return
   Backspace
   Shift key
   Option key
   Menukey FIG. 6a illustrates one embodiment of a keyboard 108 layout. In FIG. 6A, the bottom label of each key indicates its normal character, while the top left label indicates its shift key character, and the top right label indicates its option key character.

FIG. 6b illustrations just the number/punctuation keys extracted from FIG. 6a.

In an unmodified state, the keys produce the main character printed on them. In one embodiment, there is no on screen-modification state indicator for the unmodified keyboard state. In Shift state, the keys produce a capital version of the main character printed on them, as illustrated in FIG. 6a.

In Option state, the keys produce the alternate character illustrated in FIG. 6b.

In one embodiment, pressing the Option key once puts device 100 in Option state. Pressing Option in Option state puts the device in Option Lock state. Pressing Option in Option Lock state clears the state. Option state is canceled upon the entry of the Option-modified character. Option Lock state is not canceled upon the entry of the Option-modified character, hence the Lock-ness. Option state can be canceled without entering a character by pressing the Option key twice (once for lock, the second for clear) or pressing backspace. Note that in one embodiment, backspace cancels Option state, but not Option Lock state.

Figure 7A:
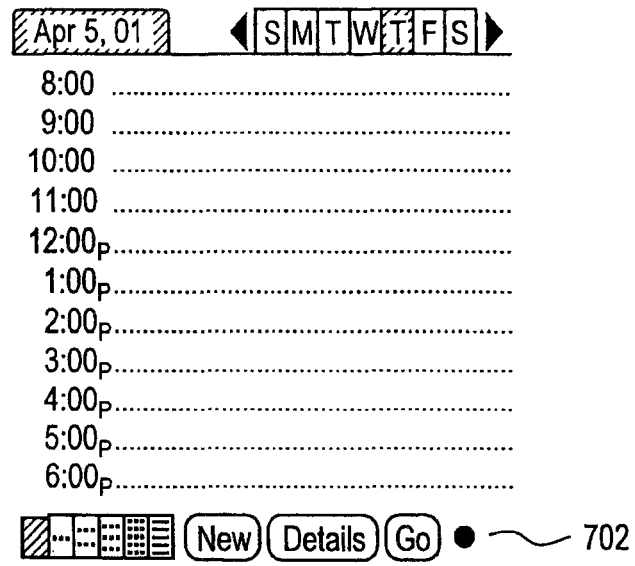
FIGS. 7a and 7b illustrates views of a display screen when Option mode and Option Lock mode are activate in accordance with an embodiment of the present invention.

Referring now to FIG. 7a, in one embodiment, an on-screen modification state indicator 702 for Option state, which indicates to the user that the Option key has been pressed, is an oval tilted to have the same appearance as the shape of the Option key itself.

Figure 7B:
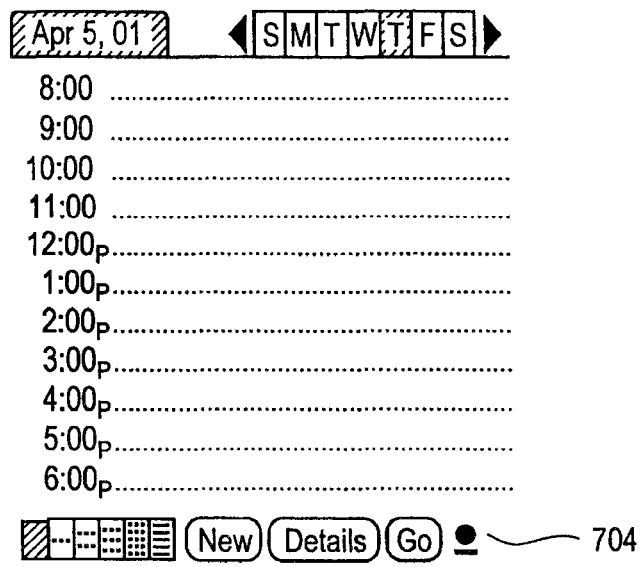

Referring now to FIG. 7b, the on-screen modification state indicator 704 for Option Lock state is similar to the Option state indicator except with a "bottom bar".

Holding down a key for a prolonged period causes the key to repeat. In one embodiment, all text entry has the same repeat rate, i.e. holding down the j produces j's at the same rate as holding down shift+ j produces J's and option +j produces 5's. The Option and Shift keys both "time out" if additional input is not received within a prescribed period of time, e.g., 3 seconds in one embodiment. Note that in one embodiment the Option Lock and Shift Lock states do not time out.

In addition, in a preferred embodiment, when the currently executing application on device 100 changes from a first application to a second application, the Shift state is cleared to avoid unintended Shifted input into the second application.

Auto Word Completion

In order to provide a fast and easy way to enter awkward or often-misspelled text, device 100 includes a word auto-completion/correction system that in one embodiment checks every word that a user enters against a database of common misspellings and convenient abbreviations and replaces the entered word with a preset correct or complete version of the word. For example, if a user enters 'beleive', it will automatically be replaced with 'believe'. If a user enters 'im', it will be replaced with 'I'm'.

In one embodiment, Word Completion executes whenever a user enters any character that signals that they are finished typing the previous word, e.g.:
   Space
   Any punctuation
   Tab
   Return
   Next or Previous Field For instance, when a user types b,e,l,e,i,v,e the word 'beleive' is still displayed. If the user then enters a space (or any of the characters listed above) then 'beleive' is replace by 'believe'. Typing backspace once will erase the space (or tab, new line, etc.) that invoked the Word Completion. Typing backspace a second time will undo the word completion without deleting the last character of the word. At this point, typing any of the characters that usually invoke Word Completion will not invoke it again.

If the replacement word in the database is not capitalized, then the capitalization of the word to be replaced is maintained. For instance, there is an entry in the Word Completion database that has the wrong word "feild" marked to be replaced with "field" so:
   feild becomes field
   Feild becomes Field If the replacement word in the database is capitalized, then the resulting word is capitalized no matter what the capitalization of the word to be replaced was. For instance, there is an entry in the Word Completion database that has the wrong word "im" marked to be replaced with "I'm" so:
   im becomes I'm
   1m becomes I'm Keyboard Navigation and Commands In one embodiment, device 100 switches off or "sleeps" in order to conserve power after a predefined period of time. In such circumstance, pressing a key on the keyboard 108 wakes the device back up, i.e. restoring the device to a power on state in the same condition that it was in prior to going to sleep. In other embodiments, waking the device 100 up is equivalent to a power on command, which starts the device with a predefined initial application. Note that the keys which will wake the device up may be predetermined, or may be changeable by the user.

In one embodiment, some navigational activities of device 100 are keyboard enabled. Buttons such as "OK," "Done," and "Cancel" are mapped to certain keys and key combinations. Common actions, which may also be on-screen buttons like "New" and "Details . . . ," are frequently included as menu items. These menu items have menu button+ letter combinations assigned to them so that they may be executed easily from the keyboard 108.

In one embodiment, menus on device 100 are navigable via a menu key and menu mode. Pressing and releasing a dedicated hardware menu key on keyboard 108 displays a first pull-down menu of the current view. Pressing and releasing the menu key a second time dismisses the menu.

While the menu is being displayed, in one embodiment the user can navigate the menus and execute menu items with the following actions:

Scroll Up displays the next menu list to the right.
  Scroll Up from the last menu list scrolls back to the first.
  Holding Scroll Up repeats this action at the normal repeat rate.
Scroll Down moves a highlight down through the current displayed list of menu items.
  If there is no highlighted item, such as when the menu list is first displayed, then the first press of Scroll Down highlights the first menu item.
  Scroll Down from the last menu item in the list scrolls back to the first item in the same list.
  Holding Scroll Down repeats this action at the normal repeat rate.
Space executes the highlighted menu item on press.
Return also executes the highlighted menu item on press.
Backspace dismisses the menu.
At any time when any menu is displayed, pressing any of the short cut letters executes the corresponding menu item, even if that menu item is in a menu list that is not currently displayed.
Typing any character that is not detailed above or a short cut letter plays an error beep.

At any time, whether or not a menu is displayed, pressing and holding the menu key and pressing a one of the shortcut letters executes the corresponding menu item, in one embodiment, without the menu being drawn on the screen. Pressing and releasing the menu key and then pressing the shortcut letter will display the menu, however, in one embodiment.

Any menu that is being displayed is dismissed whenever a menu item is executed. Shift Lock and Option Lock are ignored when entering short cut letters. It is possible, however, to enter an option character as a short cut character in parallel:

User presses the menu button to enter menu mode
User presses and holds Option
User presses x for instance
The menu item with the short cut character? would get executed, because the question mark (?) is formed by pressing Option-x.
Pressing and releasing Option and then pressing x would execute the menu item with the short cut letter x.
Menu mode itself will not clear the modification state, but the execution of a menu item may clear the modifications state depending on what that menu item does.

User starts in Option Lock
User presses the menu button
User presses the menu button again to dismiss the menu
The user should still be in Option Lock Thus, when buttons containing certain text are on the screen, certain keys or key combinations can be pressed that will execute the buttons as if they were pressed on the screen.

The buttons that are mapped to the keyboard in one embodiment are:
  OK
  Done
  Cancel
  Yes
  No
  Next
  Previous The following four keys/key combinations are used for mapping to certain common on-screen buttons in one embodiment:
  Return
  Backspace
  Option+Return
  Option+Backspace
    Option+Return and Option+Backspace will work on in parallel.
Globally, in one embodiment:
Option+Return executes:
  OK
  Done
  Yes
  Next
  Send
  Accept
Option+Backspace executes:
  Cancel
  No
  Previous
  Back
  Reject In one embodiment, if there is no opportunity for text entry on a particular screen, then the holding down of the Option key may be unnecessary. Thus, for example, within the context of alert dialogs:

Return executes:
  OK
  Done
  Yes
  Next
  Send
  Accept
Backspace executes:
  Cancel
  No
  Previous
  Back
  Reject Return and Backspace do not map to buttons in other contexts in one embodiment, since in other contexts there will likely be text areas in which Return and Backspace benefit from their normal functionality.

In addition, in one embodiment the mappings described above also apply to non-English based applications. For example, Option+Return is mapped to "Oui" in a French language application. This allows a user to execute a foreign-language application on device 100 while providing similar functionality to an English-language application.

The foregoing discloses exemplary methods and embodiments of the present invention. It will be understood that the invention may be embodied in other forms and variations without departing from the spirit or scope of the invention. Accordingly, this disclosure of the present invention is illustrative, but not limiting, of the invention, the scope of which is defined by the following claims.

What is claimed is:

1. A method for operating a mobile computing device including a display, a ringer switch, a power button, and one or more processors, the method performed by the one or more processors of the mobile computing device and comprising:
receiving an incoming call;
generating an audible ring indicative of the incoming call based on the ringer switch being in a first state;
generating a vibration indicative of the incoming call based on the ringer switch being in a second state; and
stopping the vibration, without powering off the mobile computing device, based on a user pressing the power button.

2. The method of claim 1, wherein the mobile computing device comprises a cellular phone.

3. The method of claim 1, wherein the mobile computing device further comprises a radio configured to operate according to a Code-Division Multiple-Access (CDMA) wireless standard or a Global System for Mobile Communications (GSM) standard.

4. The method of claim 1, further comprising:
muting a sound made by the mobile computing device based on the ringer switch being in the second state.

5. The method of claim 4, wherein the sound comprises an alarm.

6. The method of claim 4, wherein the sound comprises a message alert.

7. The method of claim 1, further comprising:
silencing the audible ring, without powering off the mobile computing device, based on the user pressing the power button.

8. The method of claim 1, wherein the ringer switch is separate from the display.

9. The method of claim 1, wherein:
the ringer switch is located on a first face of the mobile computing device; and
the display is located on a second face of the mobile computing device, the first face different than the second face.

10. The method of claim 1, wherein the ringer switch is moveable between a first position and a second position, the first position corresponding to the first state, and the second position corresponding to the second state.

11. A method for operating a mobile computing device including a display, a ringer switch, a power button, and one or more processors, the method performed by the one or more processors of the mobile computing device and comprising:
receiving an incoming call;
generating an audible ring indicative of the incoming call based on the ringer switch being in a first state;
generating a vibration indicative of the incoming call based on the ringer switch being in a second state; and
toggling a backlight of the display on and off based on a user actuating the power button.

12. The method of claim 11, wherein the actuating comprises the user double-tapping the power button.

13. The method of claim 11, further comprising:
turning off the mobile computing device based on the user pressing the power button.

14. The method of claim 11, further comprising:
silencing the audible ring, without powering off the mobile computing device, based on the user pressing the power button.

15. The method of claim 11, wherein the mobile computing device comprises a cellular phone, and the ringer switch is separate from the display.

16. A mobile computing device, comprising:
a display;
a ringer switch;
a power button; and
a memory configured to store instructions that, when executed by a processor of the mobile computing device, cause the mobile computing device to:
receive an incoming call;
generate an audible ring indicative of the incoming call based on the ringer switch being in a first state;
generate a vibration indicative of the incoming call based on the ringer switch being in a second state; and
stop the vibration, without powering off the mobile computing device, based on a user pressing the power button.

17. The mobile computing device of claim 16, wherein the mobile computing device comprises a cellular phone.

18. The mobile computing device of claim 16, further comprising a radio configured to operate according to a Code-Division Multiple-Access (CDMA) wireless standard or a Global System for Mobile Communications (GSM) standard.

19. The mobile computing device of claim 16, wherein execution of the instructions causes the mobile computing device to further:
mute a sound made by the mobile computing device based on the ringer switch being in the second state.

20. The mobile computing device of claim 19, wherein the sound comprises an alarm.

21. The mobile computing device of claim 19, wherein the sound comprises a message alert.

22. The mobile computing device of claim 16, wherein execution of the instructions causes the mobile computing device to further:
silence the audible ring, without powering off the mobile computing device, based on the user pressing the power button.

23. The mobile computing device of claim 16, wherein the ringer switch is separate from the display.

24. The mobile computing device of claim 16, wherein:
the ringer switch is located on a first face of the mobile computing device; and
the display is located on a second face of the mobile computing device, the first face different than the second face.

25. The mobile computing device of claim 16, wherein the ringer switch is moveable between a first position and a second position, the first position corresponding to the first state, and the second position corresponding to the second state.

26. A mobile computing device, comprising:
a display;
a ringer switch;
a power button; and
a memory configured to store instructions that, when executed by a processor of the mobile computing device, cause the mobile computing device to:

receive an incoming call;
generate an audible ring indicative of the incoming call based on the ringer switch being in a first state;
generate a vibration indicative of the incoming call based on the ringer switch being in a second state; and
toggle a backlight of the display on and off based on a user actuating the power button.

27. The mobile computing device of claim 26, wherein the actuating comprises the user double-tapping the power button.

28. The mobile computing device of claim 26, wherein execution of the instructions causes the mobile computing device to further:
turn off the mobile computing device based on the user pressing the power button.

29. The mobile computing device of claim 26, wherein execution of the instructions causes the mobile computing device to further:
silence the audible ring, without powering off the mobile computing device, based on the user pressing the power button.

30. The mobile computing device of claim 26, wherein the mobile computing device comprises a cellular phone, and the ringer switch is separate from the display.

31. A mobile computing device including a display, a ringer switch, a power button, and one or more processors, the mobile computing device comprising:
means for receiving an incoming call;
means for generating an audible ring indicative of the incoming call based on the ringer switch being in a first state; and
means for generating a vibration indicative of the incoming call based on the ringer switch being in a second state
means for stopping the vibration, without powering off the mobile computing device, based on a user pressing the power button.

32. The mobile computing device of claim 31, wherein the mobile computing device comprises a cellular phone.

33. The mobile computing device of claim 31, further comprising a radio configured to operate according to a Code-Division Multiple-Access (CDMA) wireless standard or a Global System for Mobile Communications (GSM) standard.

34. The mobile computing device of claim 31, further comprising:
means for muting a sound made by the mobile computing device based on the ringer switch being in the second state.

35. The mobile computing device of claim 34, wherein the sound comprises an alarm.

36. The mobile computing device of claim 34, wherein the sound comprises a message alert.

37. The mobile computing device of claim 31, wherein the ringer switch is separate from the display.

38. The mobile computing device of claim 31, wherein:
the ringer switch is located on a first face of the mobile computing device; and
the display is located on a second face of the mobile computing device, the first face different than the second face.

39. The mobile computing device of claim 31, wherein the ringer switch is moveable between a first position and a second position, the first position corresponding to the first state, and the second position corresponding to the second state.

40. A mobile computing device including a display, a ringer switch, a power button, and one or more processors, the mobile computing device comprising:
means for receiving an incoming call;
means for generating an audible ring indicative of the incoming call based on the ringer switch being in a first state;
means for generating a vibration indicative of the incoming call based on the ringer switch being in a second state; and
means for toggling a backlight of the display on and off based on a user actuating the power button.

41. The mobile computing device of claim 40, wherein the actuating comprises the user double-tapping the power button.

42. The mobile computing device of claim 40, further comprising:
means for silencing the audible ring, without powering off the mobile computing device, based on the user pressing the power button.

43. The mobile computing device of claim 40, further comprising:
means for turning off the mobile computing device based on the user pressing the power button.

44. The mobile computing device of claim 40, further comprising:
means for silencing the audible ring, without powering off the mobile computing device, based on the user pressing the power button.

45. The mobile computing device of claim 40, wherein the mobile computing device comprises a cellular phone, and the ringer switch is separate from the display.

* * * * *